(12) United States Patent
Hirano

(10) Patent No.: US 12,320,361 B2
(45) Date of Patent: Jun. 3, 2025

(54) CENTRIFUGAL COMPRESSOR

(71) Applicant: KABUSHIKI KAISHA TOYOTA JIDOSHOKKI, Aichi (JP)

(72) Inventor: Takayuki Hirano, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 139 days.

(21) Appl. No.: 18/216,742

(22) Filed: Jun. 30, 2023

(65) Prior Publication Data
US 2024/0018966 A1    Jan. 18, 2024

(30) Foreign Application Priority Data
Jul. 15, 2022  (JP) .................................. 2022-113997

(51) Int. Cl.
| | | |
|---|---|---|
| *F04D 25/06* | (2006.01) | |
| *F04D 29/051* | (2006.01) | |
| *F04D 29/58* | (2006.01) | |
| *H02K 5/20* | (2006.01) | |
| *H02K 9/19* | (2006.01) | |
| *F04D 17/12* | (2006.01) | |
| *F04D 29/42* | (2006.01) | |

(52) U.S. Cl.
CPC .......... *F04D 25/06* (2013.01); *F04D 29/051* (2013.01); *F04D 29/584* (2013.01); *H02K 5/203* (2021.01); *H02K 9/19* (2013.01); *F04D 17/122* (2013.01); *F04D 29/0513* (2013.01); *F04D 29/4206* (2013.01)

(58) Field of Classification Search
CPC ...... F04D 25/06; F04D 17/122; F04D 29/051; F04D 29/0513; F04D 29/4206; H02K 5/203; H02K 9/19
See application file for complete search history.

(56) References Cited

U.S. PATENT DOCUMENTS

| | | | | |
|---|---|---|---|---|
| 3,060,335 A | * | 10/1962 | Greenwald | ............ H02K 5/203 |
| | | | | 310/58 |
| 11,043,875 B2 | * | 6/2021 | Fatemi | .................. H02K 5/203 |
| (Continued) | | | | |

FOREIGN PATENT DOCUMENTS

| | | |
|---|---|---|
| JP | 2013-172564 A | 9/2013 |
| JP | 2015-104214 A | 6/2015 |
| (Continued) | | |

*Primary Examiner* — Charles G Freay
(74) *Attorney, Agent, or Firm* — Greenblum & Bernstein, P.L.C.

(57) ABSTRACT

A centrifugal compressor includes a rotary shaft, an electric motor, an impeller, a thrust bearing, and a housing having a passage that includes a motor cooling passage and a bearing cooling passage. The housing includes an inner housing and an outer housing. The motor cooling passage is defined by the inner housing and the outer housing. The passage includes a branching passage through which cooling fluid is divided and flows into the motor cooling passage and the bearing cooling passage and a joining passage through which the cooling fluid flowing through the bearing cooling passage joins the cooling fluid flowing through the motor cooling passage. The motor cooling passage includes a guide wall that guides the cooling fluid flowing through the motor cooling passage.

3 Claims, 4 Drawing Sheets

(56) References Cited

U.S. PATENT DOCUMENTS

2015/0308456 A1* 10/2015 Thompson .............. F04D 17/12
                                                       417/244
2019/0345956 A1   11/2019 Iizuka et al.
2020/0256344 A1*  8/2020 Sakota ................. F04D 29/057
2020/0259193 A1*  8/2020 Sakota .................... F04D 25/06
2021/0293253 A1    9/2021 Castellanos et al.

FOREIGN PATENT DOCUMENTS

JP      2020-165401 A   10/2020
JP      2021-148121 A    9/2021
WO    WO2018/139497      8/2018

* cited by examiner

CENTRIFUGAL COMPRESSOR

CROSS-REFERENCE TO RELATED APPLICATION

This application claims priority to Japanese Patent Application No. 2022-113997 filed on Jul. 15, 2022, the entire disclosure of which is incorporated herein by reference.

BACKGROUND ART

The present disclosure relates to a centrifugal compressor.

The centrifugal compressor includes a rotary shaft, an electric motor, an impeller, a thrust bearing, and a housing made of metal. The electric motor has a rotor and a stator. The electric motor rotates the rotary shaft. The impeller integrally rotates together with the rotary shaft to compress fluid. The thrust bearing rotatably supports the rotary shaft.

A housing of an electric compressor disclosed in International Patent Application Publication No. 2018/139497 has a passage through which cooling fluid flows. The passage includes a motor cooling passage through which the cooling fluid flows to cool the electric motor and a bearing cooling passage through which the cooling fluid flows to cool the bearing. The motor cooling passage and the bearing cooling passage are series passages that are connected in series. After the cooling fluid flows through the motor cooling passage, the cooling fluid flows through the bearing cooling passage.

In a case where the motor cooling passage and the bearing cooling passage are the series passages as described in the Publication, all the cooling fluid introduced into the passage flows through the motor cooling passage and the bearing cooling passage. For that reason, flow rates of the cooling fluid flowing through each of the motor cooling passage and the bearing cooling passage are increased, thereby increasing a pressure drop of the cooling fluid.

SUMMARY

In accordance with an aspect of the present disclosure, there is provided a centrifugal compressor that includes a rotary shaft, an electric motor having a stator formed in a tubular shape and rotating the rotary shaft, an impeller integrally rotating together with the rotary shaft to compress fluid, a thrust bearing rotatably supporting the rotary shaft, and a housing made of metal and having a passage through which cooling fluid flows. The passage includes a motor cooling passage through which the cooling fluid flows to cool the electric motor and a bearing cooling passage through which the cooling fluid flows to cool the thrust bearing. The housing includes an inner housing that is formed in a tubular shape and accommodates the stator and an outer housing that is formed in a tubular shape and accommodates the inner housing. The motor cooling passage is defined by an outer peripheral surface of the inner housing and an inner peripheral surface of the outer housing. The passage includes a branching passage through which the cooling fluid is divided and flows into the motor cooling passage and the bearing cooling passage and a joining passage through which the cooling fluid flowing through the bearing cooling passage joins the cooling fluid flowing through the motor cooling passage. The motor cooling passage includes a guide wall that is formed in at least one of the inner housing or the outer housing and guides the cooling fluid flowing through the motor cooling passage such that the cooling fluid flows in a circumferential direction of the stator.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DESCRIPTION OF EMBODIMENTS

The following will describe an embodiment of a centrifugal compressor according to the present disclosure with reference to accompanying FIGS. 1 to 7. The centrifugal compressor of the present embodiment is mounted on a fuel cell vehicle. The fuel cell vehicle includes a fuel cell stack that generates electricity by a chemical reaction of hydrogen and oxygen. The centrifugal compressor of the present embodiment is used in a feeding device that feeds air including oxygen into the fuel cell stack.

<Configuration of Centrifugal Compressor>

Figure 1:
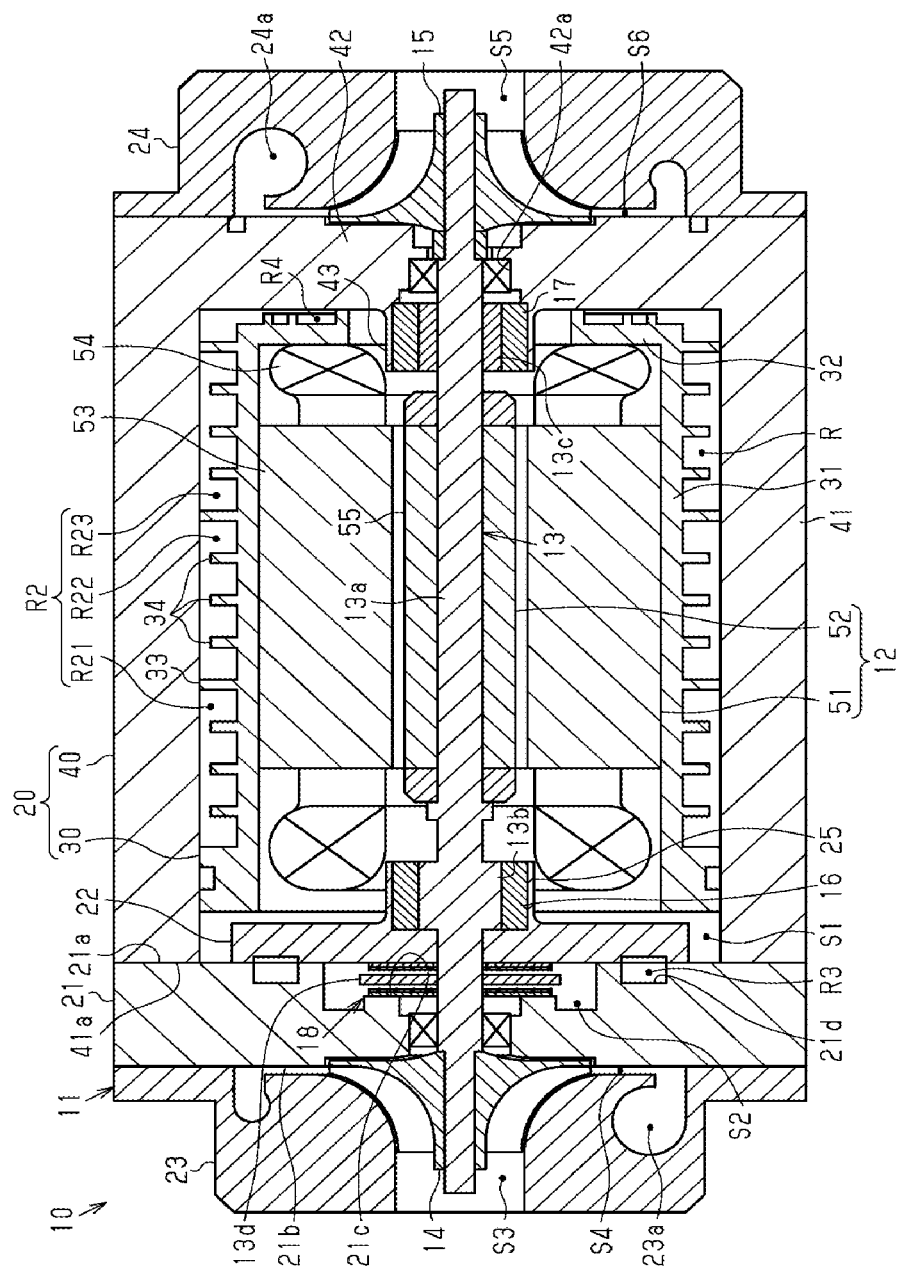
FIG. 1 is a longitudinal sectional view illustrating a centrifugal compressor according to an embodiment of the present disclosure.

As illustrated in FIG. 1, a centrifugal compressor 10 includes a housing 11 made of metal, an electric motor 12, a rotary shaft 13, a first impeller 14, a second impeller 15, a first radial bearing 16, a second radial bearing 17, thrust bearings 18, and an inverter (not illustrated). The housing 11 of the present embodiment is made of aluminum.

<Housing>

The housing 11 includes a motor housing 20, an outer plate 21, an inner plate 22, a first compressor housing 23, and a second compressor housing 24. The motor housing 20 includes an inner housing 30 and an outer housing 40 that are each formed in a tubular shape.

Figure 2:
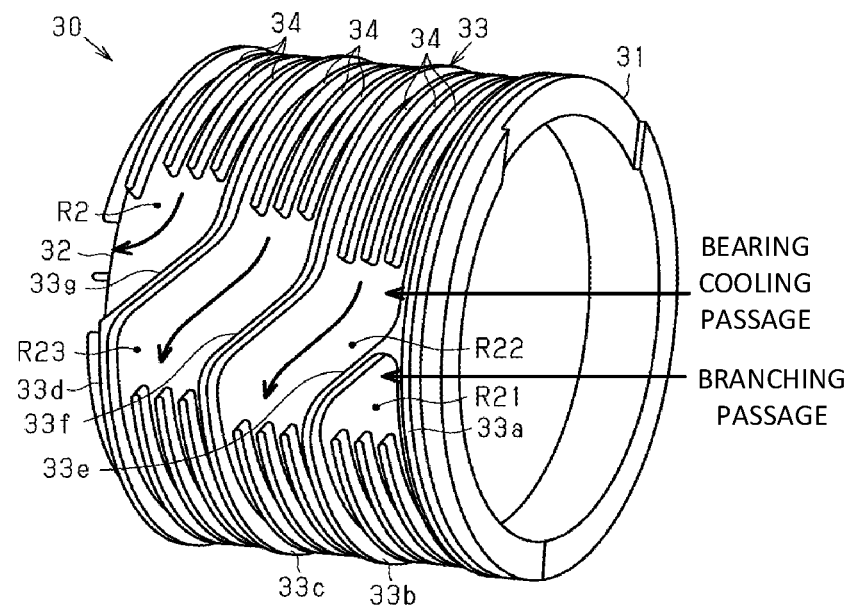
FIG. 2 is a perspective view illustrating an inner housing according to the embodiment.
Figure 3:
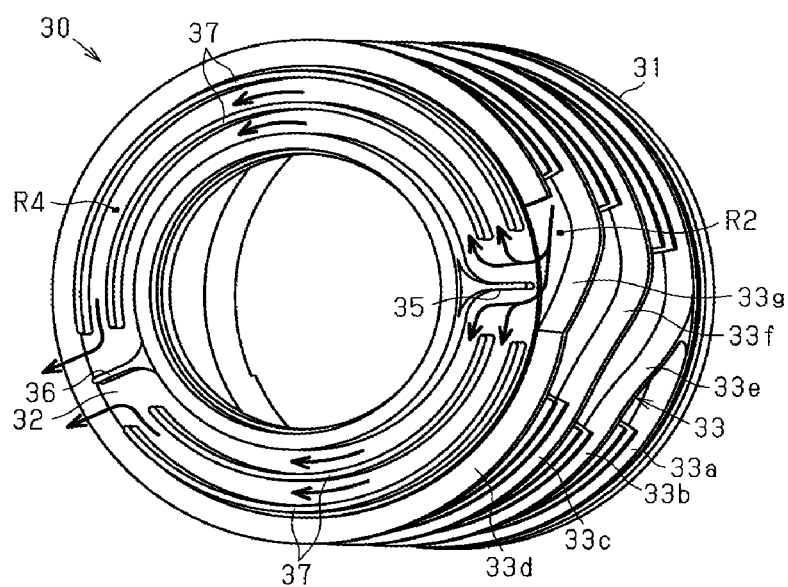
FIG. 3 is a perspective view illustrating the inner housing according to the embodiment.

As illustrated in FIGS. 2 and 3, the inner housing 30 has an inner housing peripheral wall 31 formed in a cylindrical shape and an inner housing end wall 32 formed in a ring shape. The inner housing end wall 32 is disposed at one end of the inner housing peripheral wall 31 in an axial direction of thereof. The inner housing end wall 32 extends radially inward from the one end of the inner housing peripheral wall 31 in the axial direction thereof.

As illustrated in FIG. 2, the inner housing 30 has a guide wall 33 protruding in a radial direction of the inner housing 30 from an outer peripheral surface of the inner housing peripheral wall 31. The guide wall 33 extends in a substantially spiral shape.

The guide wall 33 of the present embodiment has a first peripheral wall portion 33a, a second peripheral wall portion 33b, a third peripheral wall portion 33c, and a fourth peripheral wall portion 33d. The first peripheral wall portion 33a to the fourth peripheral wall portion 33d extend in a circumferential direction of the inner housing peripheral wall 31. The first peripheral wall portion 33a, the second peripheral wall portion 33b, the third peripheral wall portion 33c, and the fourth peripheral wall portion 33d are arranged in an axial direction of the inner housing peripheral wall 31 in this order from the other end of the inner housing peripheral wall 31 opposite to the inner housing end wall 32 toward the inner housing end wall 32. The first peripheral wall portion 33a is formed in a ring shape.

The guide wall 33 also has a first connection wall portion 33e, a second connection wall portion 33f, and a third connection wall portion 33g. The first connection wall portion 33e to the third connection wall portion 33g extend obliquely to the circumferential direction of the inner housing peripheral wall 31. The first connection wall portion 33e to the third connection wall portion 33g are arranged in the axial direction of the inner housing peripheral wall 31 in this order from the other end of the inner housing peripheral wall 31 opposite to the inner housing end wall 32 toward the inner housing end wall 32. The first connection wall portion 33e connects the first peripheral wall portion 33a to a first end portion of the second peripheral wall portion 33b. The second connection wall portion 33f connects a second end portion of the second peripheral wall portion 33b opposite to the first end portion of the second peripheral wall portion 33b to a first end portion of the third peripheral wall portion 33c. The third connection wall portion 33g connects a second end portion of the third peripheral wall portion 33c opposite to the first end portion of the third peripheral wall portion 33c to a first end portion of the fourth peripheral wall portion 33d.

The inner housing 30 of the present embodiment has first fins 34 protruding in the radial direction of the inner housing 30 from the outer peripheral surface of the inner housing peripheral wall 31. A length of each of the first fins 34 protruding from the outer peripheral surface of the inner housing peripheral wall 31 is shorter than a length of the guide wall 33 protruding from the outer peripheral surface of the inner housing peripheral wall 31. Three first fins 34 are arranged in the axial direction of the inner housing peripheral wall 31 between the first peripheral wall portion 33a and the second peripheral wall portion 33b, between the second peripheral wall portion 33b and the third peripheral wall portion 33c, and between the third peripheral wall portion 33c and the fourth peripheral wall portion 33d, the peripheral wall portions of each combination being adjacent to each other in the axial direction of the inner housing peripheral wall 31.

As illustrated in FIG. 3, the inner housing 30 has a first rib 35 and a second rib 36. The first rib 35 and the second rib 36 protrude from the inner housing end wall 32 in a direction away from the inner housing peripheral wall 31. The first rib and the second rib 36 extend in the radial direction of the inner housing end wall 32. A position of the first rib 35 in the circumferential direction of the inner housing end wall 32 coincides with a portion in which the fourth peripheral wall portion 33d is not formed in the circumferential direction of the inner housing peripheral wall 31. The second rib 36 is disposed at a position shifted by 180 degrees from the first rib 35 in the circumferential direction of the inner housing end wall 32.

The inner housing 30 has second fins 37. The second fins 37 protrude from the inner housing end wall 32 in the direction away from the inner housing peripheral wall 31. The second fins 37 are each formed in an arc shape extending in the circumferential direction of the inner housing end wall 32. Two second fins 37 are arranged in the radial direction of the inner housing end wall 32 between the first rib 35 and the second rib 36.

As illustrated in FIG. 1, the outer housing 40 is formed in a bottomed tubular shape, and has an outer housing peripheral wall 41 formed in a tubular shape and an outer housing end wall 42 formed in a circular plate shape. The outer housing end wall 42 is disposed at one end of the outer housing peripheral wall 41 in the axial direction of thereof. The outer housing end wall 42 has a shaft insertion hole 42a. The shaft insertion hole 42a extends through the outer housing end wall 42 in the axial direction of the outer housing peripheral wall 41. The outer housing 40 has a first bearing holding portion 43 formed in a tubular shape. The first bearing holding portion 43 extends in the axial direction of the outer housing peripheral wall 41 from an inner surface of the outer housing end wall 42. An axis of the first bearing holding portion 43 coincides with an axis of the outer housing peripheral wall 41. The shaft insertion hole 42a communicates with an inside of the first bearing holding portion 43. The first bearing holding portion 43 holds a second radial bearing 17 formed in a cylindrical shape.

Figure 4:
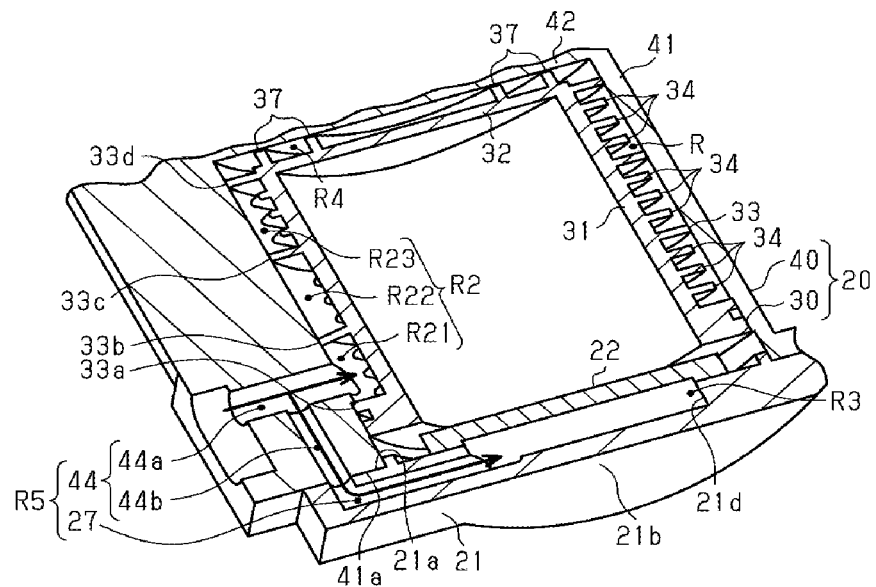
FIG. 4 is a cross-sectional view illustrating a housing according to the embodiment.

As illustrated in FIG. 4, the outer housing 40 has a first branching passage forming portion 44. The first branching passage forming portion 44 is disposed in an end portion of the outer housing peripheral wall 41 close to an open end thereof. The first branching passage forming portion 44 is formed in a T-shape. The first branching passage forming portion 44 has a radial passage 44a extending in the radial direction of the outer housing peripheral wall 41 and an axial passage 44b extending in the axial direction of the outer housing peripheral wall 41. The radial passage 44a extends through the outer housing peripheral wall 41 in the radial direction thereof. A first end of the radial passage 44a communicates with an outside of the outer housing 40. A second end opposite to the first end of the radial passage 44a opens on an inner peripheral surface of the outer housing peripheral wall 41. A first end of the axial passage 44b is connected in any portion of the radial passage 44a. A second end opposite to the first end of the axial passage 44b opens on an end surface 41a of the outer housing peripheral wall 41.

Figure 5:
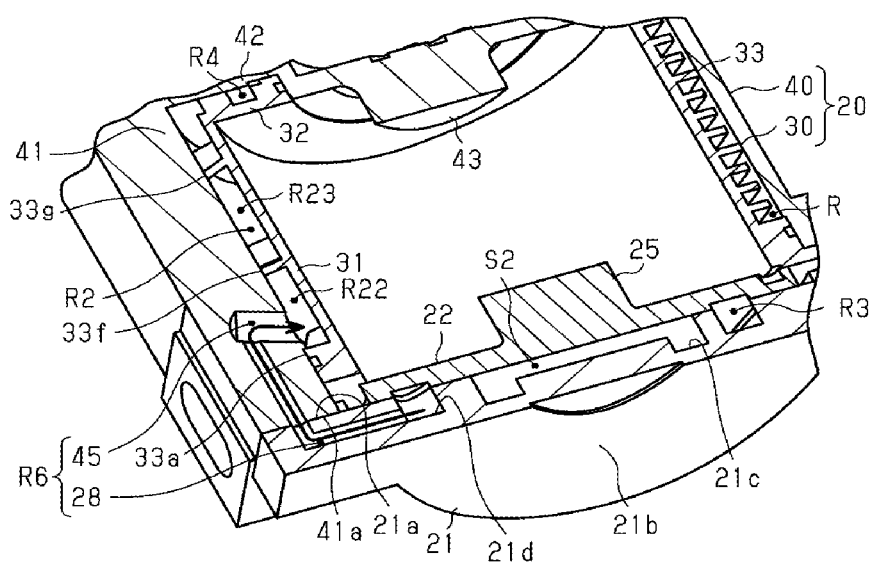
FIG. 5 is a cross-sectional view illustrating the housing according to the embodiment.

As illustrated in FIG. 5, the outer housing 40 has a first joining passage forming portion 45. The first joining passage forming portion 45 is disposed in the end portion of the outer housing peripheral wall 41 close to the open end thereof. The first joining passage forming portion 45 is away from the first branching passage forming portion 44 in the circumferential direction of the outer housing peripheral wall 41. The first joining passage forming portion 45 is formed in a L-shape. A first end of the first joining passage forming portion 45 opens on the end surface 41a of the outer housing peripheral wall 41. A second end opposite to the first end of the first joining passage forming portion 45 opens on the inner peripheral surface of the outer housing peripheral wall 41.

As illustrated in FIG. 1, the outer housing 40 accommodates the inner housing 30. The outer housing peripheral wall 41 is located outside the inner housing peripheral wall 31 in the radial direction thereof and encloses the inner housing peripheral wall 31. An axis of the outer housing peripheral wall 41 coincides with an axis of the inner housing peripheral wall 31. A direction in which the axes of the outer housing peripheral wall 41 and the inner housing peripheral wall 31 extend is defined as an axial direction of the motor housing 20. The inner peripheral surface of the outer housing peripheral wall 41 faces the outer peripheral surface of the inner housing peripheral wall 31. An end surface of the guide wall 33 is in contact with the inner peripheral surface of the outer housing peripheral wall 41. The first bearing holding portion 43 is inserted in the inner housing end wall 32. The inner surface of the outer housing end wall 42 faces the inner housing end wall 32.

The outer plate 21 is a plate formed in a ring shape. The outer plate 21 has a first surface 21a and a second surface 21b. The first surface 21a and the second surface 21b are surfaces perpendicular to a thickness direction of the outer plate 21. The second surface 21b is located opposite to the first surface 21a in the thickness direction of the outer plate 21.

The outer plate 21 has a first recess 21c and a second recess 21d. The first recess 21c and the second recess 21d are each recessed from the first surface 21a of the outer plate 21. The first recess 21c is located at an inner peripheral portion of the outer plate 21. The first recess 21c is formed in a ring shape.

Figure 6:
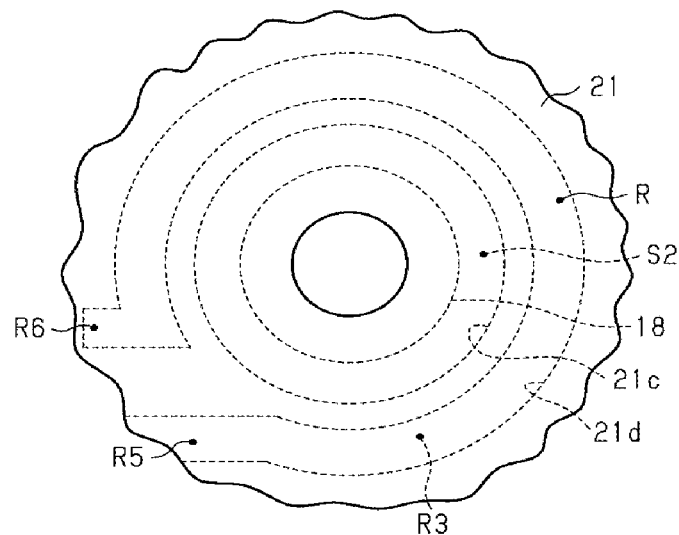
FIG. 6 is a front view partly illustrating the centrifugal compressor according to the embodiment.

As illustrated in FIG. 6, the second recess 21d extends in a circumferential direction of the outer plate 21. The second recess 21d encloses the first recess 21c. The second recess 21d is formed in a penannular shape in the circumferential direction of the outer plate 21, that is, a C-shape.

As illustrated in FIG. 4, the outer plate 21 has a second branching passage forming portion 27. The second branching passage forming portion 27 is formed in a L-shape. A first end of the second branching passage forming portion 27 opens on the first surface 21a of the outer plate 21. A second end opposite to the first end of the second branching passage forming portion 27 communicates with a first end of the second recess 21d extending in the circumferential direction of the outer plate 21.

As illustrated in FIG. 5, the outer plate 21 has a second joining passage forming portion 28. The second joining passage forming portion 28 is away from the second branching passage forming portion 27 in the circumferential direction of the outer plate 21. The second joining passage forming portion 28 is formed in a L-shape. A first end of the second joining passage forming portion 28 communicates with a second end opposite to the first end of the second recess 21d. A second end opposite to the first end of the second joining passage forming portion 28 opens on the first surface 21a of the outer plate 21.

As illustrated in FIG. 1, the outer plate 21 is connected to an end portion of the outer housing 40 close to an open end thereof. The outer plate 21 closes the open end of the outer housing 40. An inner surface of the outer housing 40 and the outer plate 21 define a motor chamber S1. The motor chamber S1 accommodates the inner housing 30, the inner plate 22, and the electric motor 12.

As illustrated in FIG. 4, the first surface 21a of the outer plate 21 is in contact with the end surface 41a of the outer housing peripheral wall 41 of the outer housing 40. The first end of the second branching passage forming portion 27 is connected to the second end of the axial passage 44b of the first branching passage forming portion 44. Accordingly, the second branching passage forming portion 27 communicates with the first branching passage forming portion 44.

As illustrated in FIG. 5, the second end of the second joining passage forming portion 28 is connected to the first end of the first joining passage forming portion 45. That is, the second joining passage forming portion 28 communicates with the first joining passage forming portion 45.

As illustrated in FIG. 1, the inner plate 22 is formed in a ring plate. The inner plate 22 is disposed between the outer plate 21 and the inner housing 30 in the axial direction of the motor housing 20. The inner plate 22 is in contact with the first surface 21a of the outer plate 21. The inner plate 22 and the first recess 21c of the outer plate 21 defines a bearing accommodation chamber S2. The bearing accommodation chamber S2 accommodates the thrust bearings 18 each formed in a circular ring shape.

The inner plate 22 has a second bearing holding portion 25 formed in a tubular shape. The second bearing holding portion 25 extends in a direction away from the outer plate 21 from an inner peripheral portion of the inner plate 22. An axis of the second bearing holding portion 25 coincides with the axis of the first bearing holding portion 43. An inner hole of the second bearing holding portion communicates with an inner hole of the outer plate 21 through the bearing accommodation chamber S2. The second bearing holding portion 25 holds the first radial bearing 16 formed in a cylindrical shape.

The first compressor housing 23 is formed in a tubular shape. The first compressor housing 23 has a first scroll passage 23a. The first scroll passage 23a extends spirally in a circumferential direction of the first compressor housing 23. The first compressor housing 23 is connected to the second surface 21b of the outer plate 21.

An inner peripheral surface of the first compressor housing 23 and the outer plate 21 defines a first impeller chamber S3. In addition, a first diffuser passage S4 is disposed between the first compressor housing 23 and the second surface 21b of the outer plate 21. The first diffuser passage S4 provides communication between the first impeller chamber S3 and the first scroll passage 23a.

The second compressor housing 24 is formed in a tubular shape. The second compressor housing 24 has a second scroll passage 24a. The second scroll passage 24a extends spirally in a circumferential direction of the second compressor housing 24. The second compressor housing 24 is connected to an outer surface of the outer housing end wall 42 of the outer housing 40.

An inner peripheral surface of the second compressor housing 24 and the outer housing end wall 42 of the outer housing 40 define a second impeller chamber S5. In addition, a second diffuser passage S6 is disposed between the second compressor housing 24 and the outer housing end wall 42 of the outer housing 40. The second diffuser passage S6 provides communication between the second impeller chamber S5 and the second scroll passage 24a.

<Electric Motor>

As illustrated in FIG. 1, the electric motor 12 has a stator 51 formed in a tubular shape and a rotor 52 disposed inside the stator 51.

The stator 51 has a stator core 53 formed in a cylindrical shape and a coil 54. The stator core 53 is fixed in the inner peripheral surface of the inner housing peripheral wall 31 of the inner housing 30. An axis of the stator core 53 coincides with the axis of the inner housing peripheral wall 31. The coil 54 is wound around the stator core 53. The inner housing 30 accommodates the stator 51. The inner housing end wall 32 of the inner housing 30 is located between the stator 51 and the outer housing end wall 42 of the outer housing 40 in the axial direction of the motor housing 20. The stator 51 is located between the inner plate 22 and the inner housing end wall 32 of the inner housing 30 in the axial direction of the motor housing 20. The rotor 52 includes a rotor core 55 formed in a cylindrical shape and permanent magnets, which are not illustrated, disposed in the rotor core 55. An axis of the rotor core 55 coincides with the axis of the stator core 53.

<Rotary Shaft, First Impeller, Second Impeller>

The rotary shaft 13 has a shaft main body 13a, a first supporting portion 13b, a second supporting portion 13c, and a third supporting portion 13d. The rotary shaft 13 is accommodated in the housing 11. A direction in which the shaft main body 13a extends is defined as an axial direction of the rotary shaft 13. The axial direction of the rotary shaft 13 coincides with the axial direction of the motor housing 20.

The shaft main body 13a is inserted in the rotor core 55 in the motor chamber S1. The shaft main body 13a is fixed in the rotor core 55. The shaft main body 13a is integrally rotatable together with the rotor 52.

The shaft main body 13a extends through the motor chamber S1, the second bearing holding portion 25, the bearing accommodation chamber S2, and the outer plate 21 so that a first end of the shaft main body 13a protrudes into the first impeller chamber S3. The first impeller 14 is connected to the first end of the shaft main body 13a. The first impeller 14 is accommodated in the first impeller chamber S3. The first impeller 14 is integrally rotatable together with the shaft main body 13a.

The shaft main body 13a extends through the motor chamber S1, the first bearing holding portion 43, and the shaft insertion hole 42a so that a second end opposite to the first end of the shaft main body 13a protrudes into the second impeller chamber S5. The second impeller 15 is connected to the second end of the shaft main body 13a. The second impeller 15 is accommodated in the second impeller chamber S5. The second impeller 15 is integrally rotatable together with the shaft main body 13a.

The first supporting portion 13b is closer to the first end of the shaft main body 13a than a middle portion of an outer peripheral surface of the shaft main body 13a. The first supporting portion 13b is disposed inside the second bearing holding portion 25. The first supporting portion 13b is integrally formed with the shaft main body 13a. The first supporting portion 13b protrudes from the outer peripheral surface of the shaft main body 13a in a radial direction of the shaft main body 13a.

The second supporting portion 13c is closer to the second end of the shaft main body 13a than the middle portion of the outer peripheral surface of the shaft main body 13a. The second supporting portion 13c is disposed inside the first bearing holding portion 43. The second supporting portion 13c is fixed to the outer peripheral surface of the shaft main body 13a, and extends from the outer peripheral surface of the shaft main body 13a so as to have a ring shape. The second supporting portion 13c is integrally rotatable together with the shaft main body 13a.

The third supporting portion 13d is closer to the first end of the shaft main body 13a than the first supporting portion 13b of the outer peripheral surface of the shaft main body 13a. The third supporting portion 13d is disposed in the bearing accommodation chamber S2. The third supporting portion 13d is fixed to the outer peripheral surface of the shaft main body 13a, and extends from the outer peripheral surface of the shaft main body 13a so as to have a ring shape. The third supporting portion 13d is integrally rotatable together with the shaft main body 13a.

<First Radial Bearing, Second Radial Bearing, Thrust Bearing>

The first radial bearing 16, the second radial bearing 17, and the thrust bearings 18 rotatably support the rotary shaft 13. The first radial bearing 16 rotatably supports the rotary shaft 13 at the first supporting portion 13b in a radial direction perpendicular to the axial direction of the rotary shaft 13. The radial direction is referred to as a radial direction of the rotary shaft 13. The second radial bearing 17 rotatably supports the rotary shaft 13 at the second supporting portion 13c in the radial direction of the rotary shaft 13. The thrust bearings 18 are disposed so as to interpose the third supporting portion 13d between the thrust bearings 18 in the axial direction of the rotary shaft 13. The thrust bearings 18 rotatably support the rotary shaft 13 at the third supporting portion 13d in a thrust direction parallel to the axial direction of the rotary shaft 13.

The first radial bearing 16, the second radial bearing 17, and the thrust bearings 18 each correspond to a gas bearing. The bearings 16, 17, 18 support the rotary shaft 13 in contact with the rotary shaft 13 until a rotational speed of the rotary shaft 13 reaches a floating rotational speed at which the rotary shaft 13 floats up. When the rotational speed of the rotary shaft 13 reaches the floating rotational speed, the rotary shaft 13 floats up from the respective bearings 16, 17, 18 by a dynamic pressure of a fluid film generated between the rotary shaft 13 and the respective bearings 16, 17, 18. Thus, the bearings 16, 17, 18 support the rotary shaft 13 in non-contact with the rotary shaft 13.

<Passage>

The housing 11 has a passage R through which coolant (LLC) serving as cooling fluid flows.

Figure 7:
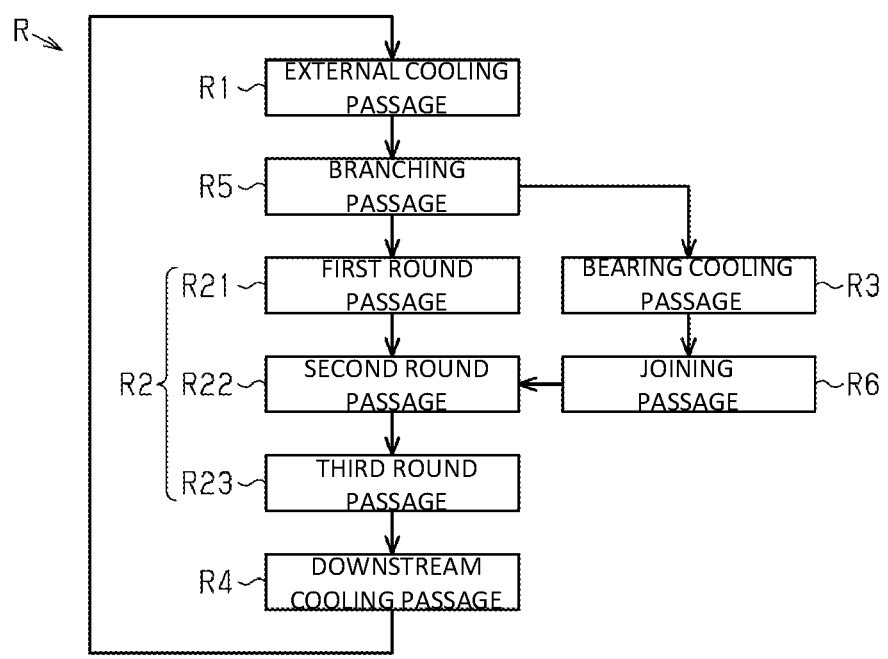
FIG. 7 is a view for explaining an order of passages through which cooling fluid flows.

As illustrated in FIG. 7, the passage R has an external cooling passage R1, a motor cooling passage R2, a bearing cooling passage R3, a downstream cooling passage R4, a branching passage R5, and a joining passage R6. The branching passage R5 is a passage through which the cooling fluid is divided and flows into the motor cooling passage R2 and the bearing cooling passage R3. The joining passage R6 is a passage through which the cooling fluid flowing through the bearing cooling passage R3 joins the coolant flowing through the motor cooling passage R2.

As illustrated in FIGS. 4 and 5, the motor cooling passage R2 is defined by the outer peripheral surface of the inner housing peripheral wall 31 of the inner housing 30 and an inner peripheral surface of the outer housing peripheral wall 41 of the outer housing 40. The motor cooling passage R2 is disposed around the stator 51. As described above, the guide wall 33 is disposed in the outer peripheral surface of the inner housing peripheral wall 31 of the inner housing 30. Accordingly, the motor cooling passage R2 has the guide wall 33. The guide wall 33 guides the coolant flowing through the motor cooling passage R2 such that the coolant flows in a circumferential direction of the stator 51. The motor cooling passage R2 is defined in a spiral shape by the guide wall 33. That is, the motor cooling passage R2 is a passage formed in the spiral shape.

The motor cooling passage R2 extends three times around the stator 51. The motor cooling passage R2 has a first round passage R21, a second round passage R22, and a third round passage R23. The first round passage R21 is defined by the outer peripheral surface of the inner housing peripheral wall 31, the inner peripheral surface of the outer housing peripheral wall 41, the first peripheral wall portion 33a, and the second peripheral wall portion 33b. The second round passage R22 is defined by the outer peripheral surface of the inner housing peripheral wall 31, the inner peripheral surface of the outer housing peripheral wall 41, the second peripheral wall portion 33b, the third peripheral wall portion 33c, the first connection wall portion 33e, and the second connection wall portion 33f. The third round passage R23 is defined by the outer peripheral surface of the inner housing peripheral wall 31, the inner peripheral surface of the outer housing peripheral wall 41, the third peripheral wall portion 33c, the fourth peripheral wall portion 33d, the second connection wall portion 33f, and the third connection wall portion 33g.

The bearing cooling passage R3 is defined by the inner plate 22 and the second recess 21d of the outer plate 21. The bearing cooling passage R3 encloses the bearing accommodation chamber S2. Accordingly, the bearing cooling passage R3 encloses the thrust bearings 18.

The downstream cooling passage R4 is defined by the inner housing end wall 32 of the inner housing 30 and the inner surface of the outer housing end wall 42 of the outer housing 40. The downstream cooling passage R4 is a passage formed in a ring shape extending in the circumferential direction of the stator 51. The stator 51 is located between the bearing cooling passage R3 and the downstream cooling passage R4 in the axial direction of the rotary shaft 13.

As illustrated in FIG. 4, the branching passage R5 is formed of the first branching passage forming portion 44 and the second branching passage forming portion 27. An entry of the branching passage R5 corresponds to the first end of the radial passage 44a of the first branching passage forming portion 44. The entry of the branching passage R5 is connected to the external cooling passage R1. The branching passage R5 branches into a passage connected to the motor cooling passage R2 and a passage connected to the bearing cooling passage R3. The passage connected to the motor cooling passage R2 is located in the radial passage 44a and close to the inner peripheral surface of the outer housing peripheral wall 41 than the axial passage 44b. The passage connected to the bearing cooling passage R3 corresponds to the axial passage 44b and the second branching passage forming portion 27. An exit of the passage connected to the motor cooling passage R2 corresponds to the second end of the radial passage 44a. An exit of the passage connected to the bearing cooling passage R3 corresponds to the second end of the second branching passage forming portion 27.

The second end of the radial passage 44a of the first branching passage forming portion 44 is located between the first peripheral wall portion 33a and the second peripheral wall portion 33b in the axial direction of the motor housing 20. Accordingly, the exit of the passage of the branching passage R5 connected to the motor cooling passage R2 is connected to the first round passage R21 of the motor cooling passage R2. As described above, the second end of the second branching passage forming portion 27 is connected to the first end of the second recess 21d. That is, the branching passage R5 communicates with the motor cooling passage R2 and the bearing cooling passage R3.

As illustrated in FIG. 5, the joining passage R6 is formed of the first joining passage forming portion 45 and the second joining passage forming portion 28. An entry of the joining passage R6 corresponds to the first end of the second joining passage forming portion 28. An exit of the joining passage R6 corresponds to the second end of the first joining passage forming portion 45.

As described above, the first end of the second joining passage forming portion 28 is connected to the second end of the second recess 21d. Accordingly, the entry of the joining passage R6 is connected to the bearing cooling passage R3. The second end of the first joining passage forming portion 45 is located between the first peripheral wall portion 33a and the second connection wall portion 33f in the axial direction of the motor housing 20. Thus, the exit of the joining passage R6 is connected to the motor cooling passage R2. In the present embodiment, the exit of the joining passage R6 is connected to the motor cooling passage R2 at an entry of the second round passage R22, that is, a point where the motor cooling passage R2 extends once around the stator 51 from a joining point to the second end of the radial passage 44a. That is, the joining passage R6 provides communication between the bearing cooling passage R3 and the motor cooling passage R2.

<Operation of Centrifugal Compressor>

The inverter supplies an electric power to the coil 54 to generate a rotating magnetic field around the stator 51, thereby rotating the rotor 52. When the rotor 52 is rotated, the rotary shaft 13 integrally rotates together with the rotor 52. That is, the inverter drives the electric motor 12. The electric motor 12 rotates the rotary shaft 13.

When the rotary shaft 13 is rotated, the first impeller 14 and the second impeller 15 integrally rotate together with the rotary shaft 13. Then, air as fluid from an outside of the housing 11 is sucked into the first impeller chamber S3. The air is compressed by the first impeller 14. Accordingly, the first impeller 14 corresponds to a compressor impeller that integrally rotates together with the rotary shaft 13 to compress the air. The sucked air compressed in the first impeller chamber S3 is decelerated through the first diffuser passage S4, that is, a velocity energy of the air is converted into a pressure energy. The high-pressure air is discharged into the first scroll passage 23a, and further discharged to the outside of the housing 11.

In the present embodiment, the air, which is discharged to the outside of the housing 11 from the first scroll passage 23a, is sucked into the second impeller chamber S5 through a pipe (not illustrated). The air sucked into the second impeller chamber S5 is compressed by the second impeller 15. Accordingly, the second impeller 15 corresponds to a compressor impeller that integrally rotates together with the rotary shaft 13 to compress air. The air compressed in the second impeller chamber S5 is decelerated through the second diffuser passage S6, that is, a velocity energy of the air is converted into a pressure energy. That is, the centrifugal compressor 10 of the present embodiment corresponds to a centrifugal compressor of a two stage compression type in which air compressed by the first impeller 14 is compressed by the second impeller 15 again. The high-pressure air is discharged into the second scroll passage 24a, and then, supplied to the fuel cell stack. Oxygen contained in the air supplied to the fuel cell stack is used for generating electricity in the fuel cell stack. Only about 20% oxygen, which is used for generating the electricity in the fuel cell stack, is contained in the air. Accordingly, about 80% of the air supplied to the fuel cell stack is discharged from the fuel cell stack, as exhaust gas, without being used for generating the electricity in the cell stack.

<Order of Passages Through which Coolant Flows>

As illustrated in FIG. 7, the coolant flows through the external cooling passage R1. For example, heat generated in the inverter is radiated into the coolant flowing through the external cooling passage R1. That is, the external cooling passage R1 through which the coolant flows cools the inverter. After the coolant flows through the external cooling passage R1, the coolant flows into the branching passage R5.

As illustrated in FIG. 4, the coolant is divided and flows into the first round passage R21 of the motor cooling passage R2 and the bearing cooling passage R3 through the branching passage R5. Accordingly, a flow rate of the coolant flowing through the motor cooling passage R2 and a flow rate of the coolant flowing through the bearing cooling passage R3 are decreased from a flow rate of the coolant flowing through the external cooling passage R1.

As illustrated in FIG. 6, the coolant, which is divided and flows into the bearing cooling passage R3, flows around the thrust bearings 18. Heat generated in the thrust bearings 18 is radiated into the outer plate 21 and the inner plate 22 through atmosphere in the bearing accommodation chamber S2. The heat, which is radiated from the thrust bearings 18 into the outer plate 21 and the inner plate 22, is radiated into the coolant flowing through the bearing cooling passage R3. That is, the bearing cooling passage R3 through which the coolant flows cools the thrust bearings 18.

Heat generated in the electric motor 12 is radiated into the outer plate 21 and the inner plate 22 through atmosphere in the motor chamber S1. The heat, which is radiated from the electric motor 12 into the outer plate 21 and the inner plate 22, is radiated into the coolant flowing through the bearing cooling passage R3. That is, the bearing cooling passage R3 through which the coolant flows also cools the electric motor 12.

Furthermore, heat generated in the first radial bearing 16 is radiated into the inner plate 22, and then, into the coolant flowing through the bearing cooling passage R3. That is, the bearing cooling passage R3 through which the coolant flows also cools the first radial bearing 16.

After the coolant flows through the bearing cooling passage R3, the coolant flows into the joining passage R6.

As illustrated in FIG. 5, in the joining passage R6, the coolant flowing through the bearing cooling passage R3 joins the coolant flowing through the motor cooling passage R2. In the present embodiment, the coolant flowing through the bearing cooling passage R3 joins the entry of the second round passage R22 of the motor cooling passage R2 through the joining passage R6. That is, the coolant flowing through the bearing cooling passage R3 joins the coolant flowing through the motor cooling passage R2 at a point where the motor cooling passage R2 extends once around the stator 51 from the joining point to the second end of the radial passage 44a through the joining passage R6.

As illustrated in FIG. 2, after the coolant, which is divided and flows into the first round passage R21 of the motor cooling passage R2, flows once around the stator 51, the coolant flows into the second round passage R22. Thus, both the coolant flowing through the first round passage R21 and the coolant flowing through the bearing cooling passage R3 flow through the second round passage R22. Accordingly, the flow rate of the coolant flowing through the second round passage R22 returns to the flow rate before the coolant is divided. After the coolant flowing into the second round passage R22 flows once around the stator 51, the coolant flows into the third round passage R23. The coolant flowing into the third round passage R23 flows once around the stator 51. Thus, the coolant in the motor cooling passage R2 is guided by the guide wall 33 to flow in the circumferential direction of the stator 51. In the present embodiment, the coolant spirally flows around the stator 51.

The heat generated in the electric motor 12 is radiated into the coolant flowing through the motor cooling passage R2 through the inner housing peripheral wall 31 of the inner housing 30. That is, the motor cooling passage R2 through which the coolant flows cools the electric motor 12.

As illustrated in FIG. 3, after the coolant flows through the third round passage R23 of the motor cooling passage R2, the coolant flows into the downstream cooling passage R4.

The coolant flowing into the downstream cooling passage R4 is divided into coolant flowing in a first direction of the circumferential direction of the stator 51 and coolant flowing in a second direction that is a reverse direction to the first direction by the first rib 35. The coolant flowing in the first direction and the coolant flowing in the second direction each flow halfway around the stator 51 in the circumferential direction of the stator 51. Then, the coolant is brought into contact with the second rib 36. This changes a flowing direction of the coolant from the direction along the circumferential direction of the stator 51 to a direction outward in a radial direction of the stator 51.

The heat generated in the electric motor 12 is radiated into the inner housing end wall 32 of the inner housing 30 through the inner housing peripheral wall 31 of the inner housing 30 and the atmosphere in the motor chamber S1. Then, the heat, which is radiated from the electric motor 12 to the inner housing end wall 32, is radiated into the coolant flowing through the downstream cooling passage R4. That is, the downstream cooling passage R4 through which the coolant flows cools the electric motor 12.

Heat generated in the second radial bearing 17 is radiated into the coolant flowing through the downstream cooling passage R4 through the first bearing holding portion 43 of the outer housing 40 and the outer housing end wall 42. That is, the downstream cooling passage R4 through which the coolant flows also cools the second radial bearing 17.

As illustrated in FIG. 7, after the coolant flows through the downstream cooling passage R4, the coolant flows into the external cooling passage R1. That is, the coolant returns to the external cooling passage R1. The coolant is circulated through the passage R.

Operations and Effects of the Present Embodiment

The following will describe operations and effects of the present embodiment.

(1) The coolant circulated through the passage R is divided and flows into the motor cooling passage R2 and the bearing cooling passage R3 through the branching passage R5. Thus, a flow rate of the coolant flowing through the motor cooling passage R2 and a flow rate of the coolant flowing through the bearing cooling passage R3 are each smaller than a flow rate of coolant flowing through a series passage, in which the motor cooling passage R2 is connected to the bearing cooling passage R3 in series. Accordingly, this configuration reduces a pressure drop of the coolant.

As a method of reducing a pressure drop of the coolant, the motor cooling passage R2 and the bearing cooling passage R3 may be formed such that they are completely independent of each other. Also in this case, the flow rates of the coolant flowing through the motor cooling passage R2 and the bearing cooling passage R3 are decreased, so that the pressure drop of the coolant is reduced. However, a temperature of the electric motor 12 becomes higher than that of the thrust bearings 18 easily. This may cause insufficient cooling of the electric motor 12 when the flow rate of the coolant flowing through the motor cooling passage R2 is reduced. As compared with this case, in the present embodiment, the coolant flowing through the bearing cooling passage R3 joins the coolant flowing through the motor cooling passage R2 through the joining passage R6.

Accordingly, the flow rate of the coolant flowing through the motor cooling passage R2 is decreased while the coolant is divided and flows through the motor cooling passage R2 and the bearing cooling passage R3. However, when the coolant flowing through the bearing cooling passage R3 joins the coolant flowing through the motor cooling passage R2, the flow rate of the coolant flowing through the motor cooling passage R2 returns to the flow rate before the coolant is divided. With this configuration, the insufficient cooling of the electric motor 12 is difficult to occur.

(2) For example, in a case where the motor cooling passage R2 does not include the guide wall 33, the coolant flowing into the motor cooling passage R2 may flow in an axial direction of the stator 51. As a result, the stator 51 has a portion where it is readily cooled and a portion where it is hardly cooled. Additionally, in the case where the motor cooling passage R2 does not include the guide wall 33, an amount of the coolant flowing into the motor cooling passage R2 may be larger than that of the coolant flowing into the bearing cooling passage R3 when the coolant is divided and flows into the motor cooling passage R2 and the bearing cooling passage R3. Then, the flow rate of the coolant flowing through the bearing cooling passage R3 becomes insufficient, so that insufficient cooling of the thrust bearings 18 may occur.

As compared with the case, in the present embodiment, the motor cooling passage R2 includes the guide wall 33 that guides the coolant flowing through the motor cooling passage R2 such that the coolant flows in the circumferential direction of the stator 51. Accordingly, the stator 51 is uniformly cooled in the circumferential direction of the stator 51. The coolant is less likely to flow into the motor cooling passage R2, as compared with the coolant in the case where the motor cooling passage R2 does not have the guide wall 33, so that the coolant also flows into the bearing cooling passage R3. Accordingly, the insufficient cooling of the thrust bearings 18 is difficult to occur by the insufficient flow rate of the coolant flowing through the bearing cooling passage R3.

(3) The bearing cooling passage R3 encloses the thrust bearings 18. With this configuration, the thrust bearings 18 are uniformly cooled in the circumferential direction of the thrust bearings 18, as compared with a case where the bearing cooling passage R3 does not enclose the thrust bearings 18. In addition, the motor cooling passage R2 is the passage formed in the spiral shape and extending a plurality of times around the stator 51. The coolant flowing through the bearing cooling passage R3 joins the coolant flowing through the motor cooling passage R2 at a point where the motor cooling passage R2 extends once around the stator 51 from the joining point to the second end of the radial passage 44a through the joining passage R6. With this configuration, the flow rate of the coolant flowing through the motor cooling passage R2 more quickly returns to the flow rate before the coolant is divided, as compared with a case where the coolant flowing through the bearing cooling passage R3 joins the coolant flowing through the motor cooling passage R2 at a point where the motor cooling passage R2 extends twice around the stator 51 from the joining point to the second end of the radial passage 44a. Accordingly, the electric motor 12 is further effectively cooled.

(4) The inner housing 30 has the inner housing end wall 32 disposed at the one end of the inner housing peripheral wall 31 in the axial direction thereof. The outer housing 40 has the outer housing end wall 42 disposed at the one end of the outer housing peripheral wall 41 in the axial direction thereof. The inner housing end wall 32 is located between the stator 51 and the outer housing end wall 42 in the axial direction of the rotary shaft 13. The passage R is defined by the inner housing end wall 32 and the outer housing end wall 42, and has the downstream cooling passage R4 into which the coolant flowing through the motor cooling passage R2 flows. The stator 51 is located between the bearing cooling passage R3 and the downstream cooling passage R4 in the axial direction of the rotary shaft 13. With this configuration, the stator 51 is also cooled by the coolant flowing through the bearing cooling passage R3 and the downstream cooling passage R4. Accordingly, the electric motor 12 is further effectively cooled.

(5) The bearing cooling passage R3 is defined by the inner plate 22 holding the thrust bearings 18 and the second recess 21d of the outer plate 21. With this configuration, the bearing cooling passage R3 through which the coolant flows cools not only the thrust bearings 18 but also the first radial bearing 16.

(6) The downstream cooling passage R4 is defined by the outer housing holding the second radial bearing 17 and the inner housing 30. Accordingly, the downstream cooling passage R4 through which the coolant flows cools not only the stator 51 but also the second radial bearing 17.

(7) For example, in a case where the first rib 35 is not formed in the downstream cooling passage R4, the coolant flowing into the downstream cooling passage R4 may flow in one direction of the circumferential direction of the stator 51. This generates a portion of the stator 51 that is likely to be cooled and a portion of the stator 51 that is unlikely to be cooled in the circumferential direction of the stator 51. On the other hand, in the present embodiment, the coolant flowing into the downstream cooling passage R4 is divided into the coolant flowing in the first direction of the circumferential direction of the stator 51 and the coolant flowing in the second direction that is the reverse direction to the first direction by the first rib 35. Accordingly, the stator 51 is uniformly cooled in the circumferential direction of the stator 51.

(8) The inner housing peripheral wall 31 of the inner housing 30 has the first fins 34. This configuration increases a surface area of the inner housing peripheral wall 31, thereby enhancing a heat dissipation of the inner housing peripheral wall 31. Accordingly, an effect of cooling the electric motor 12 is increased.

(9) The inner housing end wall 32 of the inner housing 30 has the second fins 37. This configuration increases a surface area of the inner housing end wall 32, thereby enhancing a heat dissipation of the inner housing end wall 32. Accordingly, an effect of cooling the electric motor 12 is increased.

(10) The second impeller 15 is configured to compress the air, which have been compressed by the first impeller 14. For that reason, a temperature of the air sucked into the second impeller chamber S5 is higher than that of the air sucked into the first impeller chamber S3. In the present embodiment, the thrust bearings 18 are disposed close to the first impeller chamber S3 which has a temperature lower than that in the second impeller chamber S5. Accordingly, as compared with a case where the thrust bearings 18 are disposed close to the second impeller chamber S5, an increase of a temperature of the thrust bearings 18 is suppressed in the present embodiment.

(11) As described above, the temperature of the air sucked into the second impeller chamber S5 is higher than the temperature of the air sucked into the first impeller chamber S3. Thus, a temperature of the outer housing end wall 42 of the outer housing 40 for defining the second impeller chamber S5 is easy to be high. However, in the present embodiment, heat of the outer housing end wall 42 is radiated into the coolant flowing through the downstream cooling passage R4. Accordingly, the outer housing end wall 42 is cooled.

Modification Example

The above-described embodiment may be modified as follows. The above-described embodiment and the following modifications may be combined with each other as long as they do not contradict each other.

The cooling fluid flowing through the passage R is not limited to the coolant (LLC).

The external cooling passage R1 may be omitted.

The number of times that the motor cooling passage R2 extends around the stator 51 may be changed as appropriate.

The configuration of the guide wall 33 may be changed as appropriate, as long as the cooling fluid flowing through the motor cooling passage R2 is guided by the guide wall 33 such that the coolant flows in the circumferential direction of the stator 51.

For example, the guide wall 33 may be a wall that divides the cooling fluid flowing through the motor cooling passage R2 into the cooling fluid flowing in the first direction of the circumferential direction of the stator 51 and the cooling fluid flowing in the second direction that is the reverse direction to the first direction. In this case, the cooling fluid flowing in the first direction and the cooling fluid flowing in the second direction flow halfway around the stator 51, and then join each other.

The guide wall 33 may protrude from the inner peripheral surface of the outer housing peripheral wall 41 of the outer housing 40, instead of the outer peripheral surface of the inner housing peripheral wall 31 of the inner housing 30. The guide wall 33 may protrude from both of the outer peripheral surface of the inner housing peripheral wall 31 of the inner housing 30 and the inner peripheral surface of the outer housing peripheral wall 41 of the outer housing 40. That is, the guide wall 33 only need be formed in at least one of the inner housing 30 or the outer housing 40. The "at least one of the inner housing 30 or the outer housing 40" means only the inner housing 30, only the outer housing 40, or both the inner housing 30 and the outer housing 40.

The bearing cooling passage R3 need not enclose the thrust bearings 18. As long as the thrust bearings 18 are cooled by the cooling fluid flowing through the bearing cooling passage R3, the bearing cooling passage R3 may be changed in any shape as appropriate. For example, the bearing cooling passage R3 may be a passage formed in a semicircular arc shape and extend halfway around the thrust bearings 18.

The bearing cooling passage R3 need not be a passage through which the cooling fluid flows in one direction of the circumferential direction of the thrust bearings 18. For example, the bearing cooling passage R3 may be formed in a ring shape enclosing the thrust bearings 18. The entry and exit of the bearing cooling passage R3 are disposed in respective positions shifted by 180 degrees in the circumferential direction of the bearing cooling passage R3. In this case, the cooling fluid flowing into the bearing cooling passage R3 is divided into the cooling fluid flowing in a first direction of the circumferential direction of the thrust bearings 18 and the cooling fluid flowing in a second direction that is a reverse direction to the first direction. The cooling fluid flowing in the first direction and the cooling fluid flowing in the second direction flow halfway around the thrust bearings 18, and then join each other at the exit of the bearing cooling passage R3.

The downstream cooling passage R4 may be omitted. In this case, the inner housing end wall 32 of the inner housing 30 is also omitted.

The downstream cooling passage R4 need not be defined by the inner housing end wall 32 of the inner housing 30 and the outer housing end wall 42 of the outer housing 40.

For example, the outer housing 40 need not have the outer housing end wall 42. That is, the outer housing 40 may be formed of only the outer housing peripheral wall 41. The outer plate 21 closes one open end of the outer housing 40. The housing 11 has a closing plate that closes the other open end of the outer housing 40. The closing plate has the first bearing holding portion 43 the second radial bearing 17. In this case, the downstream cooling passage R4 is defined by the inner housing end wall 32 of the inner housing 30 and the closing plate.

The downstream cooling passage R4 need not be a passage through which the cooling fluid flows in the first direction and the second direction of the circumferential direction of the stator 51. For example, the downstream cooling passage R4 may be a passage formed in a penannular shape in the circumferential direction of the stator 51, that is, a C-shape. In this case, the cooling fluid flows through the downstream cooling passage R4 in one direction of the circumferential direction of the stator 51. The configuration of the downstream cooling passage R4 may be changed as appropriate in correspondence with a position of an exit of the downstream cooling passage R4, which is connected to the external cooling passage R1.

As long as the cooling fluid is divided and flows into the motor cooling passage R2 and the bearing cooling passage R3 through the branching passage R5, the branching passage R5 may be changed in any shape as appropriate. For example, the first branching passage forming portion 44 may be formed in a Y-shape. In order to reduce a pressure drop of cooling fluid flowing through the branching passage R5, it is preferable that a shape of the branching passage R5 is not complicated.

As long as the cooling fluid flowing through the bearing cooling passage R3 joins the cooling fluid flowing through the motor cooling passage R2, the joining passage R6 may be changed in any shape as appropriate. In order to reduce a pressure drop pf the cooling fluid flowing through the joining passage R6, it is preferable that a shape of the joining passage R6 is not complicated.

A point of the joining passage R6 where the cooling fluid flowing through the bearing cooling passage R3 joins the cooling fluid flowing through the motor cooling passage R2 is not limited to the point where the motor cooling passage R2 extends once around the stator 51 from the joining point to the second end of the radial passage 44a.

For example, the cooling fluid flowing through the bearing cooling passage R3 may join the cooling fluid flowing through the second round passage R22 of the motor cooling passage R2 at any portion of the second round passage R22 or the cooling fluid flowing through the third round passage R23 through the joining passage R6.

For example, in a case where the bearing cooling passage R3 extends halfway around the thrust bearings 18, the cooling fluid flowing through the bearing cooling passage R3 may join the cooling fluid flowing through the first round passage R21 of the motor cooling passage R2 at any point of the first round passage R21 through the joining passage R6.

The cooling fluid flowing through the bearing cooling passage R3 may join the cooling fluid flowing through the motor cooling passage R2 at multiple points of the joining passage R6. For example, the cooling fluid flowing through the bearing cooling passage R3 may join the coolant flowing through the second round passage R22 and the coolant flowing through the third round passage R23 in the motor cooling passage R2 through the joining passage R6.

The centrifugal compressor 10 may be operated as follows.

The air as the fluid sucked into the first impeller chamber S3 is compressed by the first impeller 14. Accordingly, the first impeller 14 corresponds to a compressor impeller that integrally rotates together with the rotary shaft 13 to compress the fluid. The air compressed in the first impeller chamber S3 is decelerated through the first diffuser passage S4, that is, a velocity energy of the air is converted into a pressure energy. The high-pressure air is discharged into the first scroll passage 23a, and then, supplied into the fuel cell stack.

The exhaust gas discharged from the fuel cell stack is sucked into the second scroll passage 24a. Then, the exhaust gas, which is sucked into the second scroll passage 24a, is introduced into the second impeller chamber S5 through the second diffuser passage S6. The second impeller 15 is rotated by a kinetic energy of the exhaust gas, which is introduced into the second impeller chamber S5. That is, the kinetic energy of the exhaust gas is converted into a rotational energy of the second impeller 15. The rotation of the second impeller assists in rotating the rotary shaft 13. Accordingly, the second impeller 15 corresponds to a turbine impeller that assists in rotating the rotary shaft 13. The exhaust gas flowing through the second impeller chamber S5 is discharged to the outside of the housing 11.

The exhaust gas flowing through the second impeller chamber S5 contains water. Accordingly, the thrust bearings 18 are preferably disposed close to the first impeller chamber S3 in order to prevent the thrust bearings 18 from being rusted by the water in the exhaust gas.

The centrifugal compressor 10 is not limited to a compressor mounted on a vehicle.

The housing 11 need not be made of aluminum. The housing 11 may be made of other metal.

The configurations of the rotor 52 of the electric motor 12 and the rotary shaft 13 are not limited to the configuration described in the above-described embodiment.

The centrifugal compressor 10 need not include the second impeller 15.

The thrust bearings 18 may rotatably support the rotary shaft 13 at a portion of the rotary shaft 13 close to the second impeller 15, instead of a portion of the rotary shaft 13 close to the first impeller 14.

The centrifugal compressor 10 may have thrust bearings that rotatably support the rotary shaft 13 at the portion of the rotary shaft 13 close to the second impeller 15, as well as the thrust bearings 18 that rotatably support the rotary shaft 13 at the portion of the rotary shaft 13 close to the first impeller 14.

The first rib 35 may be omitted.

The first rib 35 may be protruded from the inner surface of the outer housing end wall 42 of the outer housing 40, instead of being protruded from the inner housing end wall 32 of the inner housing 30.

The second rib 36 may be omitted.

The second rib 36 may be protruded from the inner surface of the outer housing end wall 42 of the outer housing 40, instead of being protruded from the inner housing end wall 32 of the inner housing 30.

The inner housing peripheral wall 31 of the inner housing 30 need not have the first fins 34.

The number of the first fins 34 and the shape thereof may be changed as appropriate.

The inner housing end wall 32 of the inner housing 30 need not have the second fins 37.

The number of the second fins 37 and the shape thereof may be changed as appropriate.

What is claimed is:

1. A centrifugal compressor comprising:
   a rotary shaft;
   an electric motor having a stator formed in a tubular shape and rotating the rotary shaft;
   an impeller integrally rotating together with the rotary shaft to compress fluid;
   a thrust bearing rotatably supporting the rotary shaft; and
   a housing made of metal and having a cooling fluid passage through which a cooling fluid flows,
   the cooling fluid passage including a motor cooling passage through which the cooling fluid flows to cool the electric motor and a bearing cooling passage through which the cooling fluid flows to cool the thrust bearing, wherein
   the housing includes an inner housing that is formed in a tubular shape and accommodates the stator and an outer housing that is formed in a tubular shape and accommodates the inner housing,
   the motor cooling passage is defined by an outer peripheral surface of the inner housing and an inner peripheral surface of the outer housing,
   the cooling fluid passage includes a branching passage through which the cooling fluid is divided and flows into the motor cooling passage and the bearing cooling passage and a joining passage through which the cooling fluid flowing through the bearing cooling passage joins the cooling fluid flowing through the motor cooling passage, and
   the motor cooling passage includes a guide wall that is formed in at least one of the inner housing or the outer housing and guides the cooling fluid flowing through the motor cooling passage such that the cooling fluid flows in a circumferential direction of the stator.

2. The centrifugal compressor according to claim 1, wherein
   the motor cooling passage is formed in a spiral shape extending a plurality of times around the stator,
   the bearing cooling passage encloses the thrust bearing, and
   the cooling fluid flowing through the bearing cooling passage joins the cooling fluid flowing through the motor cooling passage at a point where the motor cooling passage extends once around the stator through the joining passage.

3. The centrifugal compressor according to claim 1, wherein
   the inner housing has an inner housing peripheral wall and an inner housing end wall disposed at one end of the inner housing peripheral wall in an axial direction of the inner housing peripheral wall,
   the outer housing has an outer housing peripheral wall and an outer housing end wall disposed at one end of the outer housing peripheral wall in an axial direction of the outer housing peripheral wall,
   the inner housing end wall is located between the stator and the outer housing end wall in an axial direction of the rotary shaft,
   the cooling fluid passage includes a downstream cooling passage that is defined by the inner housing end wall and the outer housing end wall and into which the cooling fluid flowing through the motor cooling passage flows, and the stator is located between the bearing cooling passage and the downstream cooling passage in the axial direction of the rotary shaft.

* * * * *